March 20, 1928.
H. SCHNEIDER
HAYSLING
Filed May 18, 1927
1,663,063
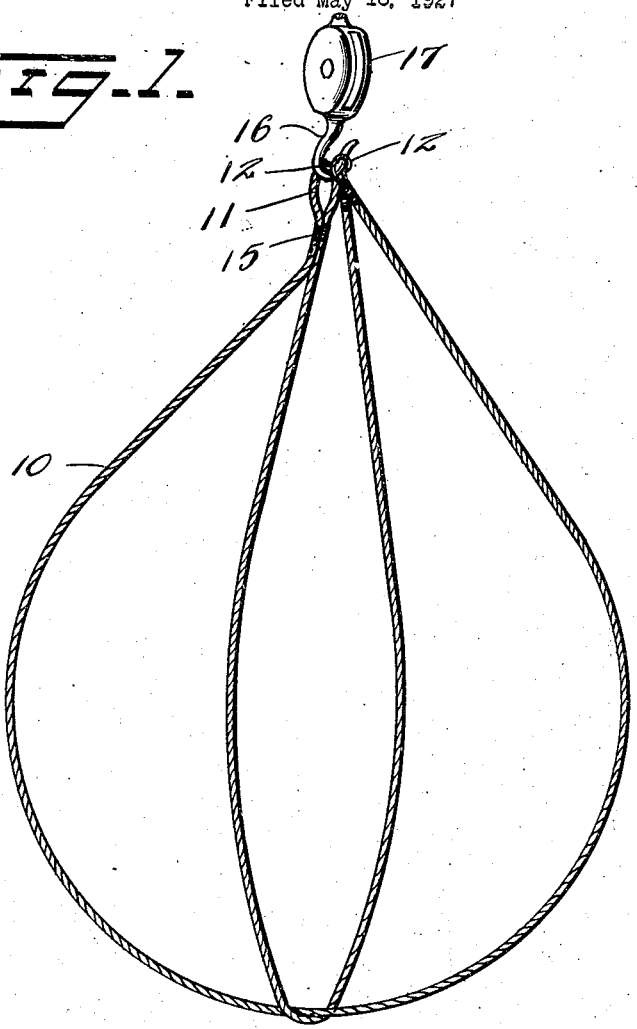
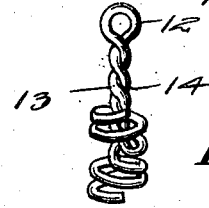
Inventor
Henry Schneider
By
Attorney Patented Mar. 20, 1928.

1,663,063

UNITED STATES PATENT OFFICE.

HENRY SCHNEIDER, OF ALDEN, MINNESOTA.

HAY SLING.

Application filed May 18, 1927. Serial No. 192,375.

This invention relates to new and useful improvements in hoisting devices, and particularly to hayslings.

One object of the invention is to provide a novel and simple sling, which can be easily bound around a mass of hay, or like material, and which may be easily and quickly released from a pulley block, when the hay has been swung up into a hay-mow.

Another object is to provide terminal eyes for the rope, forming the body of the sling, which will not be easily pulled from the rope ends, whereby to effectively support the weight of the load of hay.

Other objects and advantages will be apparent from the following description when taken in connection with the accompanying drawing.

In the drawing:

Figure 1 is a perspective view of the sling, suspended on a pulley block.

Figure 2 is an enlarged perspective view of one of the terminals of the rope of the sling.

Figure 3 is a perspective view of the terminal eye removed from the rope end.

Referring particularly to the accompanying drawing, 10 represents a rope of suitable length, which is doubled to provide the bight portion 11, and secured around the two portions of the rope, at a suitable distance from the said bight, is a binding wire 10', whereby to maintain a loop.

In each end of the rope there is secured a wire eye 12. Each eye consists of a suitable length of wire bent intermediate its length and the ends twisted, as at 12', and disposed lengthwise within the end of the rope, with each end of such wire brought out through the side of such rope end, and coiled tightly around the rope. These coiled ends of the wire are indicated at 13 and 14, respectively, in the drawing. Coiled around the end of the rope, inwardly of the bight or eye of the wire, is a short length of wire 15. This formation of the wire, and the manner in which it is coiled about the rope, holds the said wire against being pulled out of the rope end, under very heavy strains.

In using the sling, the rope is placed lengthwise of a hay rack, and then the hay, straw, or other material is piled on the rack and the sling. When a sufficient quantity of hay is placed on the rope, the bight or loop 11 is engaged with the hook 16, of the block 17, while the ends of the rope are brought around the hay and the eyes 12 also engaged with the hook. The sling of hay is then lifted and swung into the barn, and when in the proper position, the eyes are automatically released from the hook, whereby to permit the hay to fall from the slink.

What is claimed is:

1. An eye member for a rope end consisting of a length of wire having its ends passed into the rope end and finally coiled around the rope end.

2. An eye member for a rope end, said eye member comprising a length of wire doubled to form an eye, the ends of the wire being passed longitudinally into the rope end and thence brought outwardly and coiled around the rope end.

3. An eye member for a rope end comprising a length of wire doubled to form an eye and having its legs twisted for the greater portions of their lengths, said twisted legs being disposed longitudinally and centrally in the rope end, and having the terminal portions brought out through the sides of the rope end at different distances from the end thereof and coiled about said rope end.

In testimony whereof, I affix my signature.

HENRY SCHNEIDER.